United States Patent [19]

Sakaguchi et al.

[11] Patent Number: 4,664,451
[45] Date of Patent: May 12, 1987

[54] AIR BLEEDER FOR FLUID SYSTEM
[75] Inventors: Shozo Sakaguchi; Mutsuro Yamakoshi, both of Saitama, Japan
[73] Assignee: Jidosha Kiki Co., Ltd., Tokyo, Japan
[21] Appl. No.: 800,481
[22] Filed: Nov. 21, 1985
[30] Foreign Application Priority Data
  Dec. 3, 1984 [JP] Japan .............. 59-183420[U]
[51] Int. Cl.⁴ .................. B60T 17/00; B60T 8/26
[52] U.S. Cl. .................. 303/6 C; 137/513.3; 137/508; 188/349; 188/352
[58] Field of Search .......... 188/352, 322.21, 349, 188/320, 316; 267/64.28, 120; 303/6 C, 84; 137/508, 513.5, 513.3, 797; 60/591, 453, 584

[56] References Cited
U.S. PATENT DOCUMENTS

| 3,081,788 | 3/1963 | Lewis | 137/508 X |
| 3,680,922 | 8/1972 | Kawai | 137/508 X |
| 3,734,570 | 5/1973 | Stelzer | 137/508 X |
| 3,993,361 | 11/1976 | Stelzer | 137/508 X |
| 4,198,100 | 4/1980 | Nogami | 303/6 C |
| 4,236,549 | 12/1980 | Salzmann | 188/352 X |
| 4,433,872 | 2/1984 | Parker et al. | 303/6 C X |
| 4,511,185 | 4/1985 | Wloczyk | 303/6 C |
| 4,544,210 | 10/1985 | Nagashima | 303/6 C |
| 4,574,834 | 3/1986 | Inoue | 303/6 C X |

FOREIGN PATENT DOCUMENTS
1910285  2/1969  Fed. Rep. of Germany ...... 188/352

Primary Examiner—Douglas C. Butler
Attorney, Agent, or Firm—Flynn, Thiel, Boutell & Tanis

[57] ABSTRACT

An air bleeder is disclosed for a fluid system such as a braking liquid pressure control valve which operates to reduce a braking liquid pressure supplied to a rear wheel cylinder at a given proportion to a braking liquid pressure supplied to a front wheel cylinder as a braking liquid pressure is supplied from a master cylinder. An air bleeder is disposed for use with such a fluid system, in particular, with a fluid system in which a plunger is slidably received in a bore formed in a housing in which a plate is fitted to serve as a stop member and an end of the plunger is maintained in abutment against the plate when it is inoperative. A space which is defined between the periphery of the plunger in the region of its end and the internal surface of the bore and which communicates with a fluid passage extending through the plunger and the plate is sealed against an exterior by a seal member. The air bleeder comprises an air bleeding path formed in the plate so as to extend across the area of contact between the plate and the plunger to maintain the space in communication with the fluid passage. In this manner, a satisfactory air bleeding from the space is assured.

6 Claims, 5 Drawing Figures

AIR BLEEDER FOR FLUID SYSTEM

FIELD OF THE INVENTION

The invention relates to an air bleeder which withdraws or bleeds air from a fluid system such as a braking liquid pressure control valve.

DESCRIPTION OF THE PRIOR ART

A braking liquid pressure control valve for use in a braking system of vehicles is known which operates to reduce a braking liquid pressure supplied to a rear wheel cylinder at a given proportion with respect to a braking liquid pressure supplied to a front wheel cylinder as a braking liquid pressure is delivered from a master cylinder.

A braking liquid pressure control valve of the kind described usually comprises a housing in which a bore is defined, a stepped plunger which is fitted in the bore in a slidable manner and which is normally held in its inoperative position, a fluid passage which establishes a communication between a master cylinder and a rear wheel cylinder through a path formed in the housing and a bore formed in the axial portion of the plunger, and a check valve which normally opens the fluid passage, but which closes the fluid passage as the plunger is actuated from its inoperative position.

The braking liquid pressure from the master cylinder is applied to a first portion of the plunger having a reduced diameter while the braking liquid pressure applied to the rear wheel cylinder after passage through the check valve is applied to a second portion of the plunger having an increased diameter so that as the braking pressure from the master cylinder increases, the braking liquid pressure supplied to the rear wheel cylinder be reduced in proportion to the ratio of pressure responsive areas of the first and the second plunger portions.

In the braking liquid pressure control valve of the kind described, a plate is fitted in the bore in which the plunger is slidably received to serve as a stop for the plunger, and the plate is formed with a communication hole to communicate the bore in the plunger with the path formed in the housing, thus securing the fluid passage mentioned above. In addition, the space defined between the outer periphery of the first or the increased diameter portion of the plunger and the internal surface of the bore and communicating with the fluid passage in a region downstream of the check valve toward the rear wheel cylinder is sealed by means of a seal member.

When air is displaced or bled from the space defined between the outer periphery of the increased diameter portion of the plunger and the internal surface of the bore in the braking liquid pressure control valve thus constructed, the air within such space tends to be displaced toward the fluid passage through a clearance formed between the plate and the plunger which resiliently abuts against it or through a clearance between the plate and the internal wall surface of the bore in which it is fitted. Accordingly, when related parts are manufactured to a high precision to leave little clearance, there results a disadvantage that the air tends to remain within the space.

Any remaining air in the space results in a lag in the operation of the plunger, in particular, during a rapid braking action, since the failure of introducing the braking liquid pressure immediately into the space allows the air to remain therein, and subsequently when the plunger moves away from the plate to allow the introduction of the liquid pressure into the space, the liquid pressure must expel the air initially before allowing the plunger to operate again.

SUMMARY OF THE INVENTION

In view of the foregoing, it is an object of the invention to provide an air bleeding path through the plate across the area of contact between the plate and the plunger which permits the fluid passage to be maintained in communication with the space.

With this construction, the fluid passage is maintained in communication with the space through the air bleeding path if the plunger is held in abutment against the plate, thus reliably achieving an air bleeding action. If air should remain within the space, it is possible to introduce the hydraulic fluid into the space any time utilizing the air bleeding path, permitting the air within the space to be expelled immediately in response to an increase in the pressure of the hydraulic fluid. In this manner, a lag in the operation which has been caused heretofore by the remaining air can be completely eliminated.

Above and other objects, features and advantages of the invention will become apparent from the following description of several embodiments thereof with reference to the drawings.

BRIEF DESCRIPTION OF THE DRAWINGS

FIG. 2b is a cross section, taken along the line II—II shown in FIG. 2a;

FIG. 3b is a cross section taken along the line III—III shown in FIG. 3a.

DETAILED DESCRIPTION OF EMBODIMENTS

Figure 1:
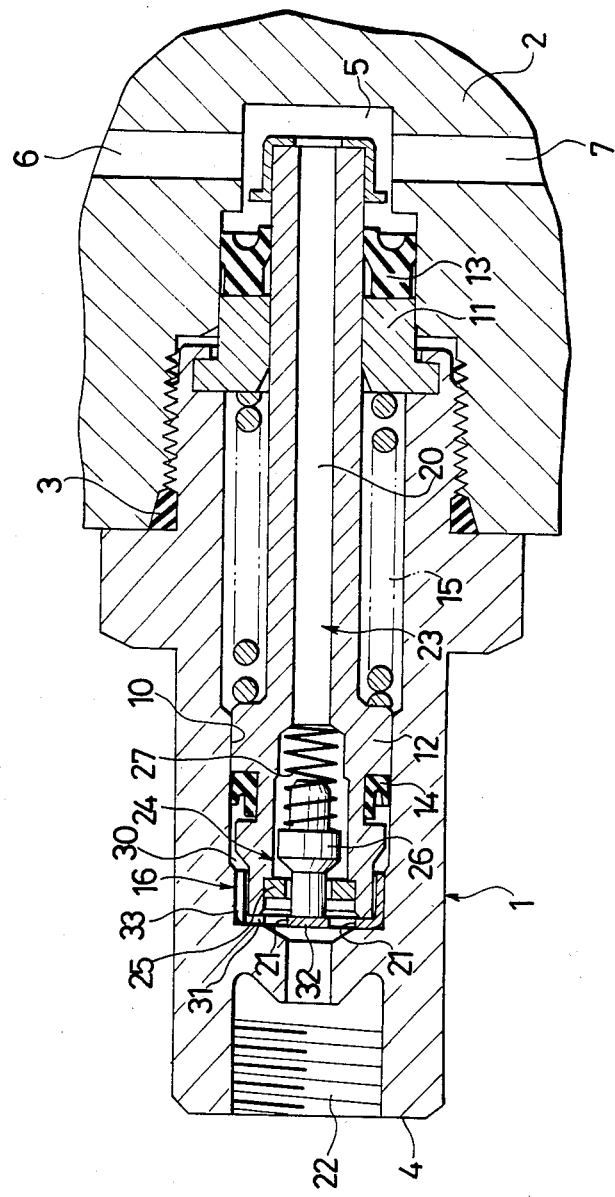
FIG. 1 is a longitudinal section of one embodiment of the invention.

Referring to the drawings, several embodiments of the invention will now be described. FIG. 1 illustrates a conventional braking liquid pressure control valve into which the invention is incorporated. The control valve has a housing 1 which comprises a housing section 2 which also serves as a housing for a master cylinder, and a cylindrical housing section 3 which is threadably engaged with the housing section 2 with a liquid tightness maintained by a seal member 4.

An input chamber 5 is defined in the area of threadable engagement between the pair of housing sections 2, 4, and when a brake pedal, not shown, is depressed to produce a braking liquid pressure within a master cylinder, such braking liquid pressure can be introduced into the input chamber 5 of the control valve through a path 6 which is formed in the housing and can also be delivered to a front wheel cylinder, not shown, directly through another path 7.

A stepped bore 10 extends through the axial portion of the cylindrical housing 4, and a lid member 11 is staked to the end of the housing 4 located adjacent to the master cylinder. A stepped plunger 12 is slidably received within the bore 10 and includes a portion of a reduced diameter which is located nearer the master cylinder so as to extend slidably through the axial portion of the lid member 11 and through a seal member 13 which is held against the right-hand end of the lid member 11 to maintain the liquid tightness of the input chamber 5, with its projecting end being disposed within the input chamber 5. The stepped plunger 12 also includes a portion of an increased diameter in which another seal member 14 is disposed to maintain the liquid tightness between the plunger and the bore 10. A spring 15 is disposed between the lid member 11 and a step formed in the plunger 12 and normally maintains the plunger 12 in its inoperative position shown where the plunger 12 abuts against a plate 16 that is fitted in the bore 10.

A bore 20 is formed to extend through the axial portion of the plunger 12, and communicates with a passage 22 which is formed in the left-hand portion of the housing 4 through a communication hole 21 which is formed in the plate 16. The passage 22 communicates with a rear wheel cylinder, not shown. In this manner, a communication between the master cylinder and the rear wheel cylinder is established through the path 6, the input chamber 5, the bore 20, the communication hole 21 and the passage 22 which are combined to define a fluid passage 23.

A check valve 24 is disposed within the bore 20 toward the passage 22, and comprises a valve seat 25 which is formed around the bore 30, a valve element 26 which is adapted to be seated upon the seat 25 from the side nearer the master cylinder, and a spring 27 which urges the valve element 26 into seating engagement with the valve seat 25. It is to be noted that the resilience of the spring 27 is selected to be less than the resilience of the spring 15 so that in the inoperative position of the plunger 12 in which it abuts against the plate 16, the valve element 26 also abuts against the plate 16 to be maintained away from the valve seat 25 against the resilience of the spring 27.

The braking liquid pressure control valve constructed in the manner mentioned above is basically known in the art. The braking liquid pressure which is introduced into the input chamber 5 from the master cylinder through the path 6 is supplied to the rear wheel cylinder, not shown, through the bore 20 in the plunger 12, the clearance between the valve element 26 and the valve seat 25 and the passage 22. When the braking liquid pressure increases and exceeds a given value, a difference between the pressure responsive area toward the passage 22 and the pressure responsive area toward the input chamber 5 of the plunger 12 results in a movement of the plunger 12 to the right, thereby closing the check valve 24 to stop an increase in the braking liquid pressure which is supplied to the rear wheel cylinder.

Subsequently as the braking liquid pressure which prevails in the input chamber 5 further increases, the plunger 12 moves back and forth in a known manner corresponding to the increase in the braking liquid pressure, allowing an increase in the braking liquid pressure supplied to the rear wheel cylinder at a rate which is less than the rate of an increase in the braking liquid pressure supplied to the front wheel cylinder and which depends on the ratio of the pressure responsive areas.

Figure 2A:
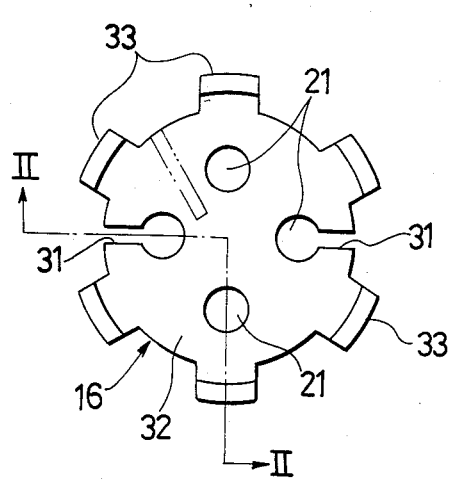
FIG. 2a is a plan view of a plate shown in FIG. 1.
Figure 2B:
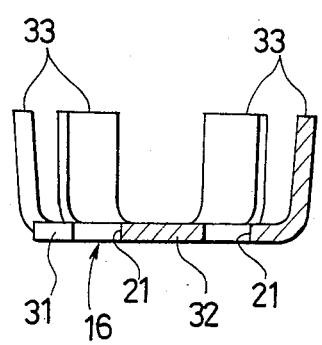

In the present embodiment, a space 30 which is defined between the outer periphery of the plunger 12 and the internal surface of the bore 10 which is formed in the housing, in a region to the left of the seal member 14, is maintained in communication with the fluid passage 23 through an air bleeder path 31 which is formed in the plate 16. The plate 16 is generally cup-shaped. It will be seen by reference to FIGS. 2a and 2b that the plate 16 comprises a disc-shaped wall 32 which is disposed in abutment against the end face of a step formed in the bore 10, and a plurality of tabs 33 extending axially from the periphery of the wall 32 and which are a press fit in the bore 10. It will be noted that the tabs 33 generally define a cylindrical configuration. It will be noted that a plurality of communication holes 21 are shown formed in the wall 32 having their centers on a concentric circle with the wall 32. Also a plurality of air bleeder paths 31 are formed in the wall 32.

Figure 3A:
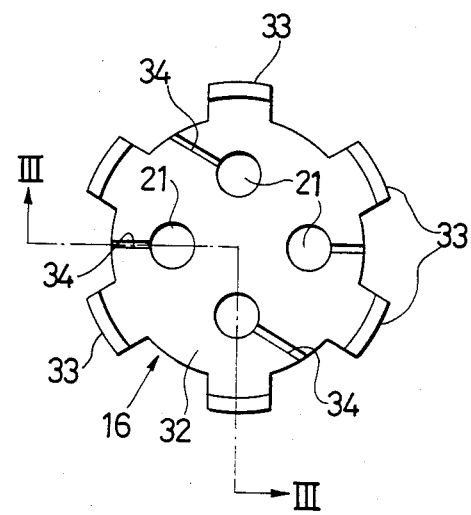
FIG. 3a is a plan view of part of another embodiment of the invention.
Figure 3B:
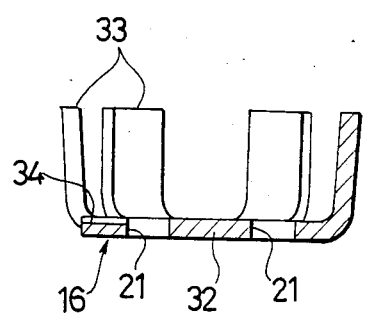

In this embodiment, the air bleeder path 31 is in the form of a slit which provides a communication between the communication hole 21 and the outer periphery of the wall 32. FIGS. 3a and 3b show an air bleeder path 34 of another embodiment. In this instance, it comprises a groove formed in the surface of the plate 16 which is engaged by the plunger 12 and communicating the communication hole 21 with the outer periphery of the wall 32. It should be understood that either slit or groove which forms the air bleeder paths 31, 34 need not extend to the communication hole 21, but may be formed as indicated by phantom lines in FIG. 2a. It is only necessary that a communication between the space 30 and the fluid passage 23 is maintained. It should also be noted that where the air bleeder path comprises a groove, such groove may be formed in the surface of the plunger 16 which is opposite from the surface that is engaged by the plunger 12.

By providing the air bleeder paths 31, 34 which maintain a communication between the space 30 and the fluid passage 23, it is possible to assure a reliable air bleeding operation by displacing the air externally from the space 30 through such path 31 or 34.

In a conventional arrangement which is not provided with such air bleeder path 31 or 34, an air bleeding operation results in the air within the space 30 being displaced through a clearance between the plate 16 and the inner wall surface of the bore 10 in which the plate 16 is fitted or through a clearance between the plate 16 and the plunger 12 which resiliently abuts against it, into the fluid passage 23 and thence to the exterior toward the rear wheel cylinder. However, the clearance between the plate 16 and the inner wall surface of the bore 10 is generally very small, and it is believed that the displacement of the air through such clearance would be insignificant.

On the other hand, the clearance defined between the plate 16 and the plunger 12 which resiliently abuts against it should be considered to be substantially absent, in particular, when the mating surfaces are machined to a high precision, at least during an inoperative interval when the plunger 12 resiliently abuts against the plate 16 to cause the air bleeding operation. Moreover, the air which may be displaced from the space 30 must pass through such reduced clearance, and then pass through the communication hole 21 which is formed toward the center of the fluid passage 23, resulting in an imperfect displacement of the air.

In a conventional apparatus which is not provided with the air bleeding path mentioned above, if air should remain within the space 30, the braking liquid pressure cannot be introduced into the space 30 immediately during the initial phase of the rapid braking operation, allowing the air to remain there, and subsequently when the plunger 12 is moved away from the plate 16 to permit the braking liquid pressure to be introduced into the space 30, such liquid pressure must initially expel the air before it operates upon the plunger 12, causing a lag in the operation of the plunger 12.

By contrast, in the present embodiment, the provision of air bleeding paths 31, 34 which maintain the space 30 in communication with the fluid passage 23 assures a reliable air bleeding operation. If any air should remain within the space 30, the braking liquid pressure is immediately introduced into the space 30 through the air bleeding paths 31, 34 as the liquid pressure increases, allowing the air to be expelled before initiating the operation of the plunger 12, thus preventing a lag in the operation thereof.

While the above embodiment illustrates the application of the invention to a braking liquid pressure control valve, it should be obvious that the invention is applicable to any other arrangements in which an air may be trapped in a space.

While the invention has been shown and described above in connection with a particular embodiment thereof, it should be understood that a number of changes, modifications and substitutions are possible therein without departing from the spirit and scope of the invention as defined by the appended claims.

What is claimed is:

1. In a braking liquid pressure control valve including a housing having a bore formed therein, a plate fitted transversely across the bore, a plunger slidably received within the bore and having its end resiliently urged into abutment against the plate when it is inoperative, a fluid passage for hydraulic fluid including in sequence (1) an axial bore formed in the plunger, (2) a communication hole formed in the plate and (3) a path formed in the housing, and a seal member encircling the plunger for sealing a space which is defined between the outer periphery of the plunger at its plate abutting end and the internal surface of the housing bore: an air bleeder comprising an air bleeding path formed in the plate to extend across the area of abutting contact between the plate and the plunger so as to maintain the space is fluid communication with the fluid passage even with the plate and plunger in said abutting contact.

2. Air bleeder according to claim 1 in which the plate includes a disc-shaped wall extending radially of the fluid passage, and a plurality of support portions extending axially from the output periphery of the wall and which are a press fit in the bore.

3. Apparatus according to claim 1 in which the air bleeding path comprises a slit extending through the both surfaces of the plate and extending along the transverse face of the plate opposed to said plunger.

4. Apparatus according to claim 1 in which the air bleeding path comprises a groove formed in the plate and extending along the transverse face of the plate opposed to said plunger, from said fluid passage to said space.

5. Apparatus according to claim 1 in which the air bleeding path is formed across the outer periphery of the plate and the communication hole.

6. In a braking liquid pressure valve including a housing having a bore formed therein, a plate fitted transversely across the bore, a plunger slidably received within the bore and having its end resiliently maintained in abutment against the plate when it is inoperative, a fluid passage for hydraulic fluid including in sequence (1) an axial bore formed in the plunger, (2) a communication hole in the plate and (3) a path formed in the housing, a check valve disposed in an axial bore formed in the plunger and adapted to be seated upon a valve seat defined on the plunger to block the axial bore when the plunger is actuated from its inoperative position and adapted to abut against the plate to be moved away from the valve seat to open the axial bore when the plunger is located at its inoperative position, the plunger having a portion of an increased diameter having a greater pressure responsive area which is subject to fluid pressure downstream of the check valve and the plunger also having a portion of a reduced diameter having a reduced pressure responsive area which is subject to fluid pressure upstream of the check valve, and a seal member disposed around the portion of the plunger having an increased diameter for sealing a space which is defined between the outer periphery of the plunger in a region of an increased diameter and the internal surface of the bore formed in the housing in which the plunger is fitted: an air bleeder comprising an air bleeding path formed in the plate to extend across the area of abutting contact between the plate and the plunger to maintain the space is communication with the fluid passage downstream of the check valve, even with the plunger and plate in said abutting contact.

* * * * *

UNITED STATES PATENT AND TRADEMARK OFFICE
CERTIFICATE OF CORRECTION

PATENT NO. : 4 664 451

DATED : May 12, 1987

INVENTOR(S) : Shozo SAKAGUCHI et al

It is certified that error appears in the above-identified patent and that said Letters Patent is hereby corrected as shown below:

Column 5, Line 35; Change "is" to ---in---.

Signed and Sealed this

Third Day of November, 1987

*Attest:*

DONALD J. QUIGG

*Attesting Officer*  *Commissioner of Patents and Trademarks*